United States Patent
Ronen et al.

(10) Patent No.: US 7,826,429 B2
(45) Date of Patent: Nov. 2, 2010

(54) TRANSMIT AND RECEIVE TRANSITION ACCELERATOR

(75) Inventors: Levi Ronen, Netanya (IL); Oded Liron, Givat-Ada (IL)

(73) Assignee: Intel Corporation, Santa Clara, CA (US)

( * ) Notice: Subject to any disclaimer, the term of this patent is extended or adjusted under 35 U.S.C. 154(b) by 697 days.

(21) Appl. No.: 11/764,905

(22) Filed: Jun. 19, 2007

(65) Prior Publication Data

US 2008/0316978 A1    Dec. 25, 2008

(51) Int. Cl.
*H04J 3/00* (2006.01)
(52) U.S. Cl. ............... 370/336; 370/326; 370/328; 370/338
(58) Field of Classification Search .......... 370/311, 370/312, 347, 336, 326, 328, 338, 310.2; 710/29; 455/423, 78, 15, 83
See application file for complete search history.

(56) References Cited

U.S. PATENT DOCUMENTS

| 6,347,084 | B1 * | 2/2002 | Hulyalkar et al. | 370/347 |
| 6,765,882 | B2 * | 7/2004 | Rittle et al. | 370/277 |
| 7,272,672 | B1 * | 9/2007 | Swenson et al. | 710/29 |
| 7,301,914 | B2 * | 11/2007 | Segal et al. | 370/311 |
| 2004/0023651 | A1 * | 2/2004 | Gollnick et al. | 455/423 |
| 2005/0018636 | A1 * | 1/2005 | Paneth et al. | 370/336 |
| 2006/0092871 | A1 * | 5/2006 | Nishibayashi et al. | 370/328 |
| 2006/0250995 | A1 * | 11/2006 | Lee | 370/276 |
| 2006/0253765 | A1 * | 11/2006 | Boer et al. | 714/749 |
| 2007/0217378 | A1 * | 9/2007 | Moorti et al. | 370/338 |

* cited by examiner

*Primary Examiner*—Kent Chang
*Assistant Examiner*—San Htun
(74) *Attorney, Agent, or Firm*—Carrie A. Boone, P.C.

(57) ABSTRACT

A transmit and receive machine (TRM) is part of a medium access controller (MAC), in support of the 802.11 wireless standard. The TRM is a control machine that changes the MAC within which it resides from a purely software-based MAC into a software and hardware management system. Timing-critical tasks that were once performed by the embedded processor of the MAC are performed by the TRM. This change enables the MAC to operate at a high speed while the TRM maintains high accuracy of transmit and receive timing operations.

20 Claims, 5 Drawing Sheets

TRANSMIT AND RECEIVE TRANSITION ACCELERATOR

TECHNICAL FIELD

This application relates to wireless transmission, and, more particularly, to performing wireless transmission according to the 802.11n standard.

BACKGROUND

The Institute of Electrical and Electronics Engineers (IEEE) has adopted a set of standards for wireless local area networks (LANs), known as 802.11. Wireless products satisfying 802.11a, 802.11b, 802.11g, and 802.11n are currently on the market.

A new generation of mobile and handheld devices has emerged, supporting multiple wireless interfaces or radios. A single mobile device, for example, may have three or four radios, each one supporting a different wireless network, such as wireless wide-area network, or WWAN (cellular), wireless local-area network, or WLAN (802.11a/b/g/n), wireless personal-area network, or WPAN (Bluetooth, UWB, Zigbee), and wireless metropolitan-area network, or WIMAX (802.16). The flexibility built into such devices is intended to maximize wireless connectivity and user experiences.

Wireless devices under the 802.11n standard are expected to support legacy standards, such as 802.11a, 802.11b, and 802.11 g. TGn is working to support data rates of up to 300 Megabits per second (Mbps) for two spatial streams and 450 Mbps for three spatial streams.

Supporting these higher data rates is difficult to achieve. For one thing, with wireless transmission, acknowledgement (ACK) packets must be sent between devices. This is because, in contrast to wired transmissions, loss rates may be quite high, 20%, 30%, even 50%, for some transmissions. Thus, device A transmits a packet to device B. The ACK to device A, in essence, informs device A that device B received the original packet.

The IEEE 802.11n specification establishes very tight timing between the time the device B receives the packet and subsequently transmits the ACK packet. This time interval is known as a short inter-frame spacing (SIFS) interval. For 802.11n, as the data rates increase, the packets are transmitted at higher rates, the packet takes more time to decode, but the SIFS interval does not change. There are two reasons for this. The training field of high-throughput frames that helps the DSP estimate the channel is positioned immediately before the payload, delaying the start of decode, relative to legacy frames. Further, the Viterbi decoder inherently works at one bit or two bits per clock. Secondly, making the Viterbi decoder faster requires either a faster clock or more hardware. For TGn rates, the amount of bits per microsecond is higher (~300 bits) compared to legacy rates (54 bits), thus considerable delay is added. Whether the frame is TGn or legacy, the receiving device, device B, should not send an ACK to device A until the received packet has been deemed correct, this may be done only after the last byte of the received frame has been decoded.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a transmit and receive machine (TRM) is disclosed, to enhance the operation of a medium access controller (MAC), in support of the 802.11n wireless standard. The TRM is a control machine that changes the MAC within which it resides from a purely software-based MAC into a software and hardware management system. Timing-critical tasks that were once performed by the embedded processor of the MAC are performed by the TRM. This change enables the MAC to operate at a high speed while the TRM maintains high accuracy of transmit and receive timing operations.

Figure 1:
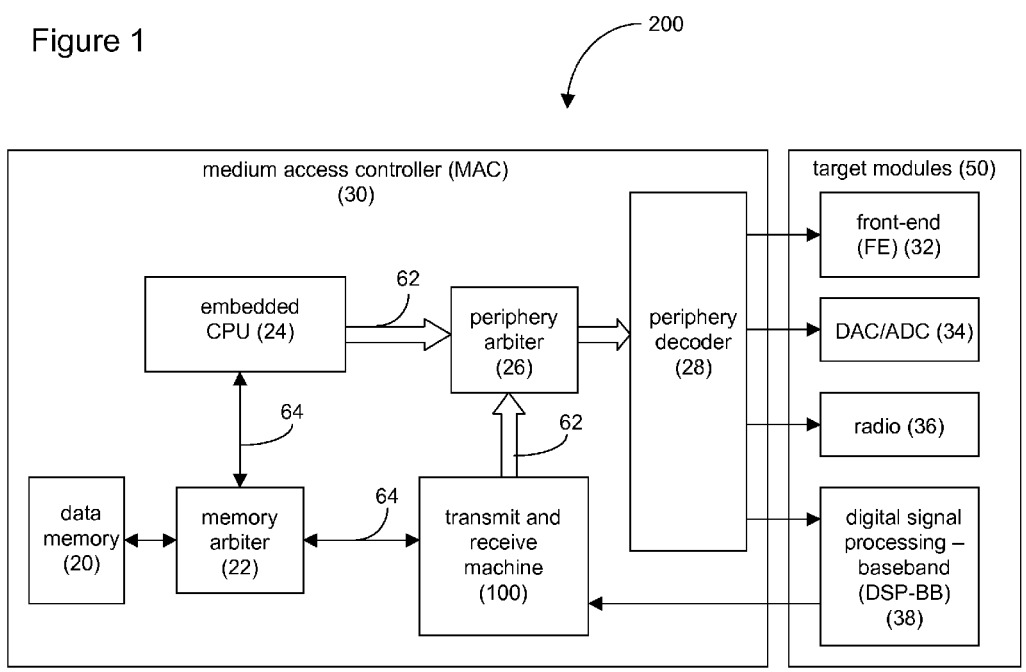
FIG. 1 is a schematic block diagram of a MAC including a transmit and receive machine (TRM), according to some embodiments.

FIG. 1 is a schematic block diagram of a system 200, consisting of a MAC 30 having a TRM 100, according to some embodiments. The system 200, which may be a wireless device, such as a laptop computer, a cellular phone, or other wireless system, may operate as a transmitter (transmit mode) or as a receiver (receive mode). The system 200 is a transmitter/receiver supporting wireless communication according to 802.11n.

In addition to the TRM 100, the MAC 30 includes an embedded central processing unit (CPU) 24, a data memory 20, a memory bus 64, a periphery arbiter, a periphery decoder 28, and a periphery bus 62. The depiction of FIG. 1 is a simplified representation of the MAC 30, and other devices, circuits, and logic elements that may be part of the MAC 30 are omitted. The MAC 30 interfaces with logic devices that are commonly found in transmitters and receivers: a front-end (FE) 32, a digital-to-analog converter/analog-to-digital converter (DAC/ADC) 34, a radio 36, and a base-band digital signal processor (DSP-BB, or simply, DSP) 38. The devices 32, 34, 36, and 38 are also known herein as target modules 50. The target modules 50, as well as the logic devices within the MAC 30, may consist of hardware, software, or a combination of hardware and software components.

The target modules 50 are commonly found in most transmitters and receivers. The FE 32 is connected to the antenna, and may include a power amplifier (PA) (for the transmitter), a low noise amplifier (LNA) (for the receiver), and an antenna switch (for switching between transmitter and receiver modes). The DAC of the DAC/ADC 34 is used to convert the digital signal coming from the DSP 38 to an analog signal prior to transmission via the radio (transmitter); conversely, the ADC of the DAC/ADC 34 is used to convert the analog signal coming from the radio to a digital signal before processing by the DSP 38 (receiver). At the transmitter, the radio transfers the signal from base-band to the carrier frequency, at the receiver, the radio transfers the signal from carrier frequency to base-band. At the receiver, the DSP 38 demodulates the OFDM/CCK signal from the ADC, for processing by the MAC 30. At the transmitter, the DSP 38 modulates the MAC data into OFDM/CCK signal in base-band frequency, and sends the resulting signal to the DAC 34.

The embedded CPU 24 and the TRM 100 share access to the data memory 20, as well as to the target modules 50. The memory arbiter 22 controls access to the data memory 20 for the CPU 24 and TRM 100 (as well as possibly for other devices not depicted in FIG. 1). The periphery bus 62 is a simple address and data bus, with the address transmitted over the bus indicating which of the target modules 50 are to receive the data. The periphery arbiter 26 controls access to the target modules 50, with the periphery decoder 28 decoding an address received from the periphery arbiter to determine the intended target module. The target modules 50 respond to commands, whether from the embedded CPU 24 or from the TRM 100, such that the target modules 50 do not know the source of the transaction. Thus, the TRM 100 may be added to a legacy MAC, with minimal change in the architecture.

Figure 2:
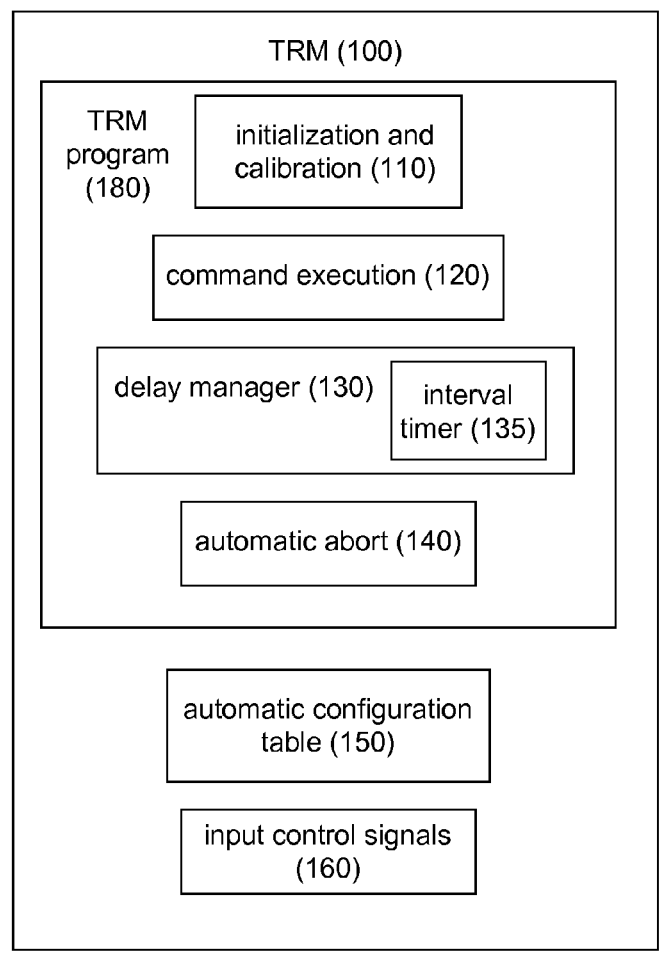
FIG. 2 is a block diagram of the TRM machine of FIG. 1, according to some embodiments.

FIG. 2 is a functional block diagram of the TRM 100, according to some embodiments. The TRM 100 includes a program 180, which is loaded into the data memory 20 (FIG. 1). The program 180 includes initialization and calibration 110, command execution 120, delay management 130, and automatic abort 140. The TRM 100 further includes an automatic configuration table 150, and input control signals 160. Although the simplified block diagram is intended to indicate some features of the TRM 100, it is not intended to convey actual organization of the TRM, as many of the features have overlapping functional aspects and may operate in conjunction with one another.

The initialization and calibration 110 of the TRM 100 initializes and calibrates the target modules 50, such as the DSP 38 and the radio 36. The command execution 120 module executes commands of the MAC 30 that have been relegated to the TRM 100. For example, the command execution 120 may cause the TRM 100 to, among other commands, turn off the receiver and turn on the transmitter of the radio 36, warm up the power amplifier of the front-end 32, perform DC calibrations of the radio 36, turn on the digital-to-analog converter 34, calibrate the transmitter, tell the DSP 38 to start transmission of the preamble, and so on.

The delay management 130 of the TRM 100 includes an interval timer 135, to enable the TRM to execute time-critical commands. Of the commands executed by the TRM 100, some portion may be executed within certain time periods. The delay management 130 ensures that, for such time-critical commands, the command execution 120 conforms to these timing constraints. Because of the very tight timing of the SIFS interval, some commands are speculatively initiated by the TRM 100, prior to completing verification of a prior frame. The automatic abort 140 enables the TRM 100 to cancel the speculatively initiated transaction upon the occurrence of one or more circumstances, to be described further below.

The automatic configuration table 150 of the TRM 100 includes configurable information about the MAC 30. In some embodiments, the automatic configuration table 150 is retrieved by the TRM 100, for quick initialization of those parts of the MAC 30 that are configurable. The input control signals 160 connect to the TRM 100 from other parts of the MAC 30, such as the DSP 38, enabling the TRM 100 to automatically perform certain commands.

Figure 3:
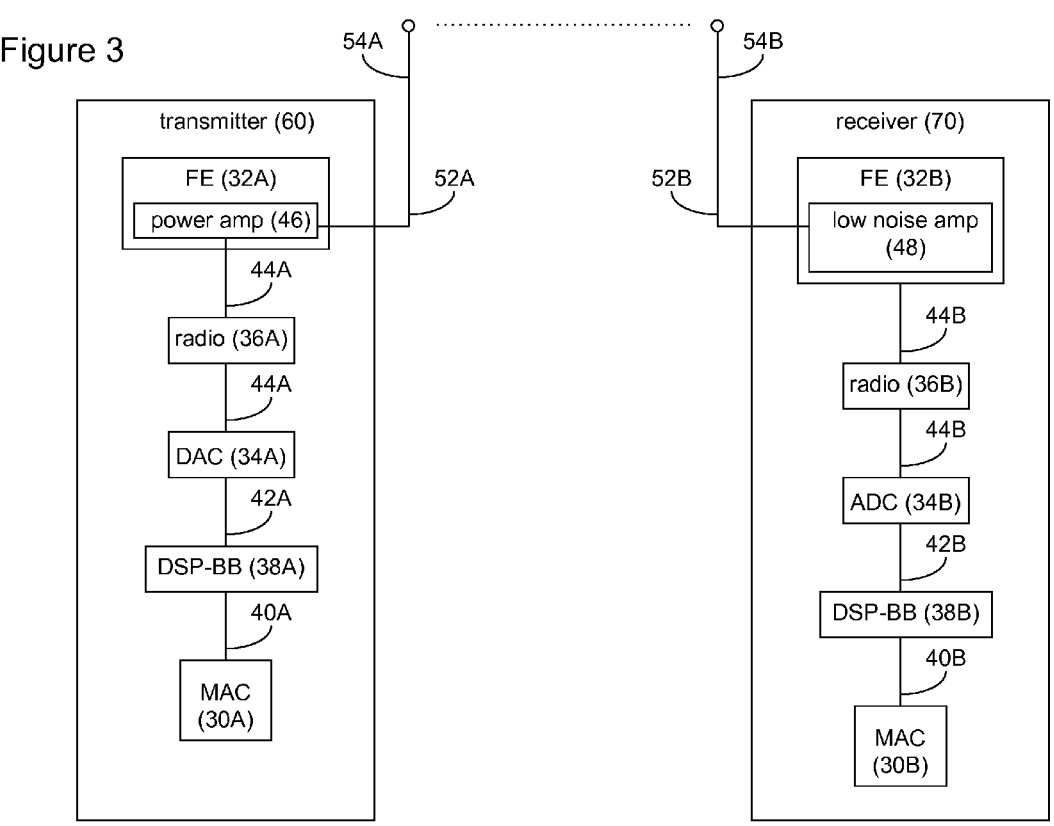
FIG. 3 is a block diagram of a transmit operation between a transmitter and a receiver, according to some embodiments.

The system 200 in FIG. 1 is a transmitter or a receiver. FIG. 3 is a block diagram showing a transmitter 60 and a receiver 70 between which a transmission is to take place. The transmitter 60 may operate as a receiver and the receiver 70 may operate as a transmitter. Although FIG. 3 shows only the components relevant to each device's function as a transmitter or a receiver, the devices most likely include common circuitry. The transmitter 60 includes an FE 32A, a radio 36A, a DAC 34A, a DSP 38A, and a MAC 30A. The receiver 70 includes an FE 32B, a radio 36B, an ADC 34B, a DSP 38B, and a MAC 30B.

A typical transmit operation occurs as follows: at the transmitter 60, the MAC 30A sends a packet 40A to the DSP 38A. The DSP 38A converts the packet 40A into a digital OFDM/CCK signal 42A and sends it to the DAC 34A. The DAC 34A converts the signal 42A into an analog signal 44A, and sends the signal to the radio 36A. The radio 36A modulates the base-band signal to the carrier frequency and sends the signal 44A to the power amplifier 46 of the FE 32A, which amplifies the signal 44A to be suitable for over-air transmission, shown as amplified analog signal 52A. The amplified analog signal 52A is transmitted over air using the antenna 54A.

At the receiver 70, the signal 52A is received by the antenna as the signal 52B. The weak analog signal 52B is received into a low noise amplifier 48 of the FE 32B, sending the amplified analog signal 44B to the radio 36B, which filters the signal according to the selected frequency band and demodulates the carrier frequency signal into base-band. The radio 36B sends the analog signal 44B to the ADC 34B, which converts the analog signal to a digital signal 42B, suitable for processing by the DSP 38B. The DSP 38B demodulates the OFDM/CCK signal 42B and converts the signal to MAC 30B packet bytes. Other operations, such as encryption and decryption of the packets, are not shown. Where the transmission is successful, the packet 40B received by the MAC 30B is the same as the packet 40A transmitted by the MAC 30A in the transmitter 60.

In some embodiments, the MAC 30 is implemented using software. A software-based MAC may be advantageous for 802.11 implementations over a pure hardware-based MAC. For one thing, software implementations offer more flexibility, as changes may be made after the hardware has been taped out to silicon. The complexity of 802.11 may also make software-based MACs easier to implement. The changes to the 802.11 standard may make software implementations more practical. For example, 802.11n has been in process for several years, and enhancements to the standard may arrive with each new TGn draft.

However, meeting the short inter-frame spacing (SIFS) interval between the end of a receive operation and the start of a transmission operation may be more difficult using software-based MACs, as such implementations tend to be slower when software-based than when hardware-based. Further, the radio 36 and FE 38 modules are sensitive to delay variations. For example, at the transmitter, there is a specific delay between the power amplifier being turned on and the start of a preamble being transmitted, as the power amplifier needs some minimum time to warm up prior to being used. Where a hardware implementation may be straightforward, these constraints may be more difficult in software. Moreover, the TGn frame structure and rates, especially using multiple-input-multiple-output (MIMO), imposes large delays in area- and power-sensitive base-band systems for processing received frames, thus making it even more difficult to send the response frame during the SIFS interval.

In some embodiments, the TRM 100 is an optimum blend of hardware and software elements, thus maintaining a flexible approach to the MAC 30. The TRM 100 includes a state machine, but also some programming logic, for higher flexibility. The TRM program 180 is loaded in the data memory 20 of the CPU 24 for execution. In some embodiments, sharing the data memory 20 with the CPU 24 is preferred, as the small amount of dedicated memory needed by the TRM 100 would be inefficient to supply separately. Further, predicting the actual size of a dedicated memory for the TRM 100 would be difficult, with a too-small memory being fatal to the design and a too-large memory being costly and inefficient to maintain. Thus, in the system 200, the data memory 20 is shared by the embedded CPU 24 and the TRM 100.

In some embodiments, the flexibility of the TRM 100, in which a portion of the TRM 100 is embodied in the TRM program 180, enables changes to the MAC hardware to be possible. For example, the radio 36 or the power amplifier 46 of the front-end 32 may be modified or replaced. Such hardware changes may not be possible with a pure hardware state machine implementation of the TRM, even when the state machine is configurable.

The TRM 100 is used in the software-based MAC 30 to generate deterministic base-band (BB) and radio frequency (RF) signals used during the transition between receiving a communications packet and transmitting an ACK packet in response. The state machine of the TRM 100 executes a program of the system general embedded CPU 24, according to input signals that describe the transmit/receive real-time state. Further, the TRM 100 configures the base-band DSP 38, the ADC/DAC 34, the radio 36, and the front-end 32 modules, according to pre-defined configurations and timing requirements.

In some embodiments, the TRM 100 occupies a small size area of the MAC 30. Adding the TRM 100 to the MAC 30 does not substantially change the architecture of the MAC 30. In some embodiments, the TRM functionality is added to the MAC 30 by including the periphery arbiter 26, the periphery bus 62, and the memory arbiter 64. The change to the MAC 30 thus enables the TRM 100 to share the data memory and periphery arbiter, enabling the TRM to fetch its program from the memory and write to the periphery devices.

The TRM 100 is connected to several input control signals 160, coming from the DSP 38. These hardware signals indicate hardware events that have occurred, and may cause the TRM 100 to initiate a fast response by the MAC 30. For example, using the hardware signals, the TRM 100 may trigger a transmit/receive (TX/RX) operation, defer a TX/RX operation, or abort a TX/RX operation.

When a transmitter sends a frame to a receiver, the receiver sends an acknowledge frame (ACK) back to the transmitter, to indicate that the initial frame is received. There are certain rules for sending the ACK frame by the receiver, according to the 802.11 specification. For example, in orthogonal frequency division multiplexing (OFDM) mode, the ACK signal is supposed to be sent out to the air 16 usec after the received signal was finished on the air, known as the SIFS interval (maximum inaccuracy of 10% is allowed). In complementary code keying (CCK) mode, the SIFS interval is 10 usec. Due to hardware constraints in the FE 32 and in the radio 36, in some embodiments, the TRM 100 should start the transition approximately 3 usec prior to transmit start on the air.

Figure 4:
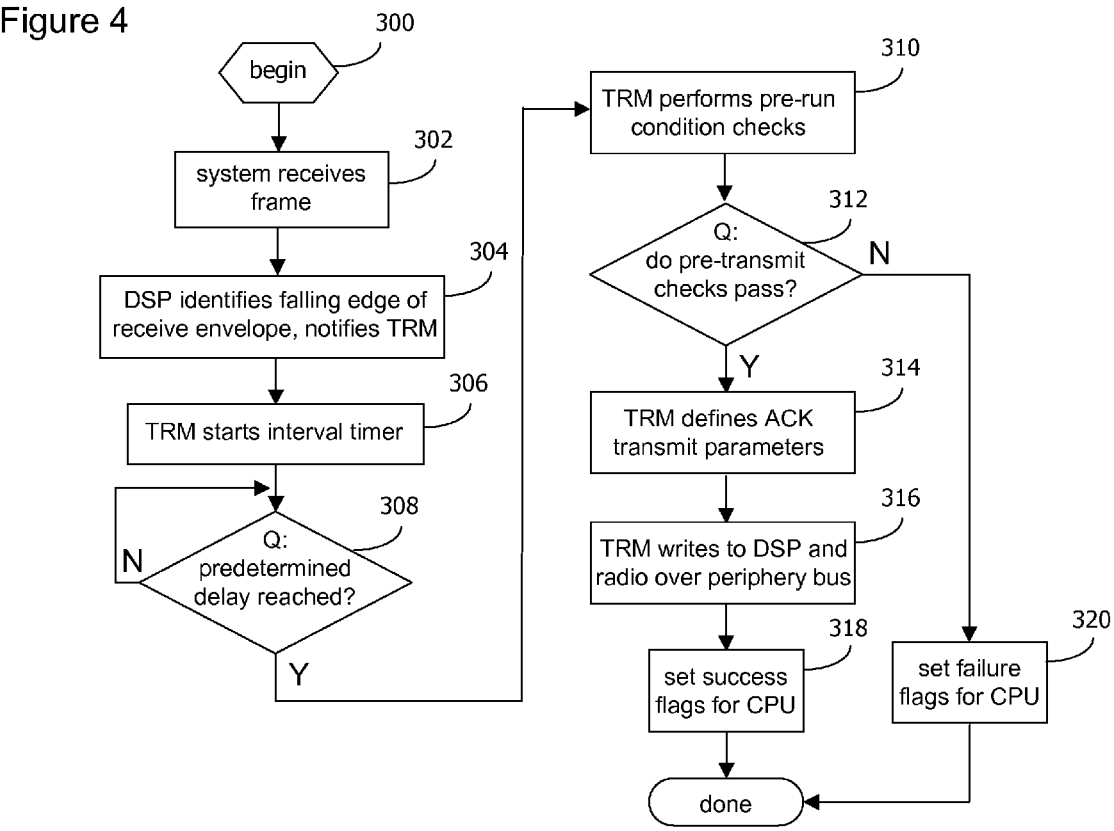
FIG. 4 is a flow diagram showing operation of the TRM to comply with the SIFS interval, according to some embodiments.

FIG. 4 is a flow diagram showing operation of the TRM 100 to comply with the SIFS interval. The system 200 receives a frame (block 302). The frame takes some time to be received by the system 200, which is characterized by a receive envelope (energy). The DSP 38 monitors the receive envelope, and notifies the TRM 100 at the falling edge of the receive envelope (block 304). This notification causes the delay manager 130 of the TRM 100 to start the interval timer 135 (block 306).

The interval timer 135 is used by the TRM 100 to keep track of a predetermined time period, such as the SIFS interval. The interval timer 135 includes a configurable value to represent the predetermined time period or predetermined delay. Since the SIFS interval is different for different modes, the interval timer 135 enables the TRM 100 to be effective in maintaining the SIFS interval according to the received frame (i.e., OFDM, 16 usec, CCK, 10 usec). In some embodiments, when the SIFS interval is 16 usec, the predetermined time period is 13 usec, as reflected in the configurable value. When the SIFS interval is 10 usec, the predetermined time period is 7 usec.

In FIG. 4, the TRM 100 performs pre-transmit condition checks (block 310) after the predetermined time period or predetermined delay has been reached (block 308). The pre-transmit condition checks consist of cyclic redundancy check (CRC), verification that the received frame is directed to the MAC 30 (according to its address1 field), and a Bluetooth coexistence test. Bluetooth coexistence may arise when the system 200 includes Bluetooth support, in addition to the wireless support of the MAC 30. A sequence of commands already initiated by the TRM 100 may be aborted if the Bluetooth feature is enabled.

If the pre-transmit checks pass, the TRM 100 defines its ACK transmission parameters (block 314), then begins its RX-to-TX transition by configuring the DSP, FE, ADC/DAC, and radio sub-systems (block 316). A success flag is set, indicating to the CPU that the pre-transmit checks passed (block 318). If the pre-transmit checks fail, the TRM notifies the CPU by one or more failure flags (block 320), and returns to an idle state.

The delay manager 130 of the TRM 100 further enables a fixed delay feature to prevent accumulated error delay. Accumulated error delay may occur, for example, when the periphery bus 62, the DSP 38, or the radio 36 stalls during access. The fixed delay feature sets a fixed delay between each group of commands.

The TRM 100 supports special case processing, in some embodiments. The TRM 100 may check the input control signals 160, such as signals coming from the DSP 38, that are configured by a software management block of the MAC 30. The special case processing increases the flexibility of the system 200 to support special cases that may not have been predicted during early stages of the design of the system 200.

The delay manager 130 of the TRM 100 also performs latency adjustment, in some embodiments. As mentioned earlier, the TRM interval timer 135 is kicked to start from time zero, upon receipt of the receive envelope falling edge. However, since the receive envelope falling edge arrives for very short frames with a delay compared to the actual airborne transmission of the signal, the delay manager 130 performs latency adjustment.

In some embodiments, latency adjustment is performed using two signals from the DSP 38 to the TRM 100. The first signal has already been discussed. When the receive envelope is complete (falling edge), the DSP 38 sends a first signal (of the input control signals 160) to the TRM 100. The DSP 38, however, is also monitoring the actual airborne transmission length. Accordingly, the DSP 38 sends a second signal (of the input control signals 160) to the TRM 100 to indicate the actual transmission time. The delay manager 130 compares the two signals, and uses this information to increase the timer value automatically, by an amount appropriate to compensate for the latency. This ensures accurate timing by the system 200.

The TRM 100 further includes an automatic abort feature 140, in some embodiments. Suppose the pre-run condition of the TRM program 180 passes, yet the pending operation should be aborted. This may be the case, for example, when corrupted data is transmitted, thus causing a bad cyclic redundancy check (CRC), or checksum, to be identified by the DSP 28. As another example, a higher priority device, such as a Bluetooth device, may be activated, such that the pending wireless (MAC) operation should be aborted. Again, the DSP 28 notifies the TRM 100 of this WiFi/Bluetooth coexistence using one of the input control signals 160. Finally, an underrun condition status in the MAC 30 indicates a loss of data, such that the TRM 100 should abort sending the ACK to the transmitter. In any of these conditions, the automatic abort feature 140 of the TRM 100, upon notification by the DSP 38, stops the pending operation. When the abort occurs, the TRM 100 initiates the program 180 to move the system 200 from a transmit mode to a receive mode of operation (e.g., back to a default system mode).

The TRM 100 works closely with the embedded CPU 24 of the MAC 30. From time to time, the CPU 24 may update (offline) the values contained in the automatic configuration table 150. These values are used to configure any programmable aspects of the TRM 100. When operation of the TRM 100 is initiated, the TRM 100 accesses the values from the automatic configuration table 150, and uses the values to configure the system 200. The automatic configuration table 150 may include RX and TX chains configuration information when the system 200 has multiple antennas according to constraints, such as the system power modes (i.e., connected to power supply or battery), and TX power configuration for the DSP and radio. The automatic configuration table 150 may also contain a different RX/TX chain configuration whether operating in OFDM or CCK.

Figure 5:
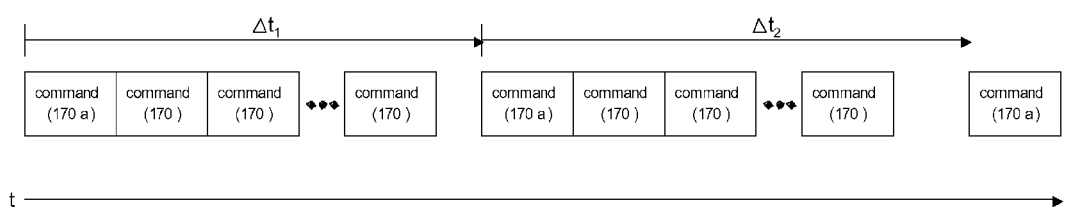
FIG. 5 is a schematic diagram showing how the TRM of FIG. 1 processes commands, according to some embodiments.

FIG. 5 is a schematic diagram of a timeline, t, alongside a series of commands 170 to be executed by the TRM 100. The commands 170 are in control/address/data form that is typical of MAC 30 operations. Even though the commands 170 are shown being identical in shape and size, the commands may vary substantially, with some taking longer to execute than others. Although these commands 170 should be executed in a particular order, there is no strict timing constraint on their execution.

Three of the commands 170a in FIG. 5 are different from the commands 170. The commands 170a include a strict timing constraint, also known as "$\Delta t$" and "$\Delta t_2$", in their command field. These commands 170a are executed with strict timing with respect to one another. For these commands, the TRM 100 invokes the delay manager 130 and interval timer 135. The remaining commands 170 have no such timing constraint. In some embodiments, the TRM 100 "fits" commands 170, to the extent possible, between time-constrained commands 170a. As long as the commands fitting between the two time-constrained commands are executed according to their intended relative order, the TRM 100 may fit as many commands 170 as possible, as long as the $\Delta t$ and $\Delta t_2$ of the time-constrained commands 170a is respected.

The TRM 100 thus enables a flexible software approach while still being compatible to strict TGn compliance, for a cost-sensitive physical layer (PHY) system. The TRM 100 removes the need to design several specific state machines and thus makes system debug and configuration easier, in some embodiments. The TRM 100 is also suitable for handling variable requirement that are known only late in the integration phase. The ability to change PHY transition flows without changing the MAC 30 reduces the need for extensive silicon revisions to handle unpredictable PHY system behavior.

The TRM 100 changes the black-box behavior of the software-based MAC toward the PHY system to look like a deterministic hardware-based MAC, with very little change of the actual system architecture. Adding the TRM 100 to the MAC 30 results in some change in the embedded software, but a very local hardware change (except to the TRM design itself). The PHY devices themselves remain unchanged, as the TRM 100 may be connected on a standard peripheral bus of the system including the MAC 30.

The TRM 100 allows a software-based IEEE-802.11 MAC to perform transmit-to-receive and receive-to-transmit transitions in a deterministic and configurable way, which is essential to meet the external specifications with base-band, radio, and front-end modules that typically involve flow modification until late stage in the system integration phase.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A system, comprising:
  a medium access controller to wirelessly communicate with a remote device under an 802.11n wireless standard, the medium access controller comprising:
    a processor to transmit frames to and receive frames from the remote device under a modulation standard using one or more target modules, the one or more target modules comprising a digital signal processor;
    a transmit and receive machine to process frames received wirelessly from the remote device;
  wherein:
    the digital signal processor sends a first hardware control signal to the transmit and receive machine when a receive envelope closes, wherein the closed receive envelope indicates an end of a received frame, wherein the hardware control signal is coupled between the digital signal processor and the transmit and receive machine;
    the transmit and receive machine starts an interval timer to denote a first time period;
    if the transmit and receive machine confirms that:
      the received frame is addressed to the medium access controller; and
      the received frame is without error;
    then, the transmit and receive machine initiates an acknowledge signal to be sent to the remote device by the processor at a second time period;
  wherein the duration between the second time period and the first time period is within a short inter-frame spacing interval of the modulation standard.

2. The system of claim 1, wherein the transmit and receive machine confirms that the received frame is intended for the medium access controller by receiving a second hardware control signal from the digital signal processor and the transmit and receive machine confirms that the receive frame is without error by receiving a third hardware control signal from the digital signal processor.

3. The system of claim 2, wherein the transmit and receive machine further turns on a power amplifier and a radio so that the system can begin transmission of the acknowledge signal.

4. The system of claim 3, the transmit and receive machine further comprising:
  a software program loaded in a memory, wherein the software program to process the frames received wirelessly from the remote device, the software program comprising:
    an initialization and calibration module, to initialize and calibrate the one or more target modules;

a command execution module to execute commands; and a delay manager to operate the interval timer.

5. The system of claim 4, wherein the initialization and calibration module of the transmit and receive machine performs one or more of the following operations:

switches the radio from being a receiver to being a transmitter;

switches the radio from being a transmitter to being a receiver;

warms up the power amplifier in the front-end module;

performs direct current calibration of the radio;

turns on a digital-to-analog converter;

turns on an analog-to-digital converter;

calibrates the transmitter of the radio; and instructing the digital signal processor to start transmitting a preamble.

6. The system of claim 1, wherein the modulation comprises orthogonal frequency division multiplexing and the short inter-frame spacing interval is sixteen microseconds.

7. The system of claim 1, wherein the modulation comprises complementary code keying and the short inter-frame spacing interval is ten microseconds.

8. The system of claim 1, the transmit and receive machine further comprising:

an automatic configuration table comprising values for configurable features of the medium access controller, wherein the transmit and receive machine accesses the automatic configuration table to quickly initialize the configurable features the medium access controller.

9. The system of claim 1, the transmit and receive machine further comprising:

an automatic abort module to cancel a transmission to the remote device.

10. The system of claim 9, wherein the automatic abort module is invoked by the transmit and receive machine when a Bluetooth device is attempting a transmission.

11. The system of claim 9, wherein the automatic abort module is invoked by the transmit and receive machine when a checksum of the incoming frame is invalid.

12. A medium access controller, comprising:

an embedded processor to transmit and receive frames wirelessly to a remote device according to a modulation standard;

a data memory coupled to the embedded processor;

a transmit and receive machine coupled to the data processor, the transmit and receive machine comprising:

a software program to be loaded into the data memory and executed; and a plurality of hardware input control signals to report conditions to the software program;

wherein the transmit and receive machine processes a received frame using the hardware input control signals, enabling the embedded processor to send an acknowledge signal to the remote device within a short inter-frame spacing interval of the modulation standard, wherein the transmit and receive machine further:

initializes and calibrates target modules, as needed, enabling the medium access controller to transmit and receive frames;

aborts a transmission when a condition is not met, as indicated by one of the plurality of hardware input control signals; and calculates a time between the receipt of a frame and the transmission of an acknowledge frame, wherein the time is less than or equal to the short inter-frame spacing interval of the modulation standard.

13. The medium access controller of claim 12, wherein the transmit and receive machine aborts transmissions when a Bluetooth device initiates a Bluetooth transmission.

14. The medium access controller of claim 13, wherein the transmit and receive machine aborts transmissions when a cyclic redundancy check performed by a digital signal processor fails, as indicated by a second one of the plurality of hardware input control signals.

15. The medium access controller of claim 14, wherein the transmit and receive machine further:

confirms that the received frame is addressed to the medium access controller;

confirms that the received frame is error-free; and receives a hardware input control signal to denote the end of the frame;

wherein the transmit and receive machine initiates an acknowledge signal to be transmitted to the remote device only after these conditions are met.

16. The medium access controller of claim 15, wherein the transmit and receive machine confirms that the received frame is addressed to the medium access controller and error-free after the hardware input control signal denotes the end of the frame, such that the time is adjusted to account for the latency.

17. The medium access controller of claim 14, the transmit and receive machine further comprising:

an automatic abort to abort processing the received frame in response to a failure of a pre-run condition.

18. The medium access controller of claim 17, wherein the pre-run condition is a bad cyclic redundancy check of the received frame.

19. The medium access controller of claim 17, wherein the pre-run condition is a Bluetooth coexistence condition.

20. The medium access controller of claim 17, wherein the pre-run condition is a busy airway by another station.

* * * * *